US008994235B2

(12) United States Patent
Doll et al.

(10) Patent No.: US 8,994,235 B2
(45) Date of Patent: Mar. 31, 2015

(54) ELECTRIC MOTOR FOR A SMALL ELECTRIC DEVICE

(75) Inventors: Alexander Doll, Kronberg (DE); Uwe Schober, Glashuetten (DE); Frank Kressman, Eschborn (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 13/357,702

(22) Filed: Jan. 25, 2012

(65) Prior Publication Data

US 2012/0119596 A1     May 17, 2012

Related U.S. Application Data

(63) Continuation of application No. 13/314,384, filed on Dec. 8, 2011, which is a continuation of application No. PCT/IB2010/005260, filed on Jun. 11, 2010.

(51) Int. Cl.

| | |
|---|---|
| *H02K 33/00* | (2006.01) |
| *H02K 35/00* | (2006.01) |
| *H02K 16/02* | (2006.01) |
| *H02K 33/02* | (2006.01) |
| *H02K 21/28* | (2006.01) |
| *H02K 41/035* | (2006.01) |

(52) U.S. Cl.
CPC .............. *H02K 16/02* (2013.01); *H02K 33/02* (2013.01); *H02K 21/28* (2013.01); *H02K 41/0356* (2013.01); *H02K 2201/18* (2013.01)
USPC .............. 310/36; 310/12.14; 310/14; 310/38; 310/90.5

(58) Field of Classification Search
CPC ....... H02K 33/02; H02K 16/02; H02K 21/28; H02K 41/0356; H02K 2201/18
USPC ............................ 310/36, 12.14, 14, 38, 90.5
IPC ............................................. H02K 33/00,35/00
See application file for complete search history.

(56) References Cited

U.S. PATENT DOCUMENTS

| | | | | |
|---|---|---|---|---|
| 4,135,119 | A | * | 1/1979 | Brosens ........................ 318/128 |
| 6,566,775 | B1 | * | 5/2003 | Fradella ........................ 310/90.5 |
| 6,794,777 | B1 | * | 9/2004 | Fradella ........................ 310/74 |

(Continued)

FOREIGN PATENT DOCUMENTS

| | | |
|---|---|---|
| EP | 0 850 027 B1 | 5/2002 |
| EP | 1 922 017 B | 4/2009 |

(Continued)

OTHER PUBLICATIONS

Richard Fitzpatrick, "Magnetic Field of Solenoid", University of Texas, Jul. 2007.*

(Continued)

*Primary Examiner* — John K Kim
(74) *Attorney, Agent, or Firm* — Alexandra S. Anoff (57) ABSTRACT

An electric motor for operating a small electric device is disclosed. The electric motor includes at least one first oscillatory motor component; an inductor for producing a magnetic field; and a first magnet arrangement including a first permanent magnet that generates a force for activating a rotatory oscillating movement (R) of the at least one first oscillatory motor component around a rotating axis (z). The at least one first oscillatory motor component and the first magnet arrangement are configured such that a magnetic reluctance torque acting between the first oscillatory motor component and the first permanent magnet operates as a righting moment for the rotatory oscillating movement (R).

8 Claims, 10 Drawing Sheets

(56) References Cited

U.S. PATENT DOCUMENTS

| | | | |
|---|---|---|---|
| 7,554,225 B2* | 6/2009 | Kraus et al. | 310/36 |
| 2002/0195884 A1* | 12/2002 | Ichii et al. | 310/15 |
| 2006/0255664 A1* | 11/2006 | Kraus et al. | 310/36 |
| 2006/0255665 A1* | 11/2006 | Kraus et al. | 310/36 |
| 2008/0211435 A1* | 9/2008 | Imagawa | 318/130 |
| 2010/0001592 A1* | 1/2010 | Kawano et al. | 310/12.14 |
| 2012/0119596 A1* | 5/2012 | Doll et al. | 310/36 |

FOREIGN PATENT DOCUMENTS

| | | |
|---|---|---|
| JP | 61-180562 | 8/1986 |
| JP | 07-288964 A | 10/1995 |
| JP | 2004-194499 | 7/2004 |
| JP | 2005-009625 | 1/2005 |
| JP | 2007-506539 | 3/2007 |
| WO | WO 2005/006538 A1 | 1/2005 |
| WO | WO 2005/048437 | 5/2005 |
| WO | WO 2005/062445 | 7/2005 |
| WO | WO 2009/081295 A2 | 7/2009 |

OTHER PUBLICATIONS

PCT International Search Report for PCT/IB2010/052620—Case Z-8347MQ—dated Nov. 12, 2010.

* cited by examiner

ELECTRIC MOTOR FOR A SMALL ELECTRIC DEVICE

CROSS REFERENCE TO RELATED APPLICATIONS

This application is a continuation of U.S application No. 13/314,384, filed Dec. 8, 2011, which is a continuation of international application No. PCT/AB2010/052620, filed Jun. 11, 2010, designating the U.S., the substance of which are incorporated herein by reference in their entirety.

FIELD OF THE INVENTION

The present disclosure relates to an electric motor for operating a small electric device. More particularly, the present disclosure relates to a small electric device having such an electric motor. The present disclosure also relates to a method for operating such an electric motor and a method for its production.

BACKGROUND OF THE INVENTION

WO 2005/006538 A1 is based on a small electric device having an electric motor for producing an oscillating movement. Two drive components are provided, one of which is connected by means of at least one elastic element to a flexible part and can be activated; it can instigate an oscillating movement by means of a magnetic field of an inductor. The two drive components are connected to each other by means of an additional element and are designed so that they mutually drive each other and are arranged in the small electric device for executing oscillating movements in phase opposition to each other.

Electric motors are known that can generate a rotatory and translatory oscillating movement and which are used, for example, for electric toothbrushes. An electric motor like the one described in WO 2005/062445, has two oscillatory motor components and a magnet arrangement having several permanent magnets. An inductor is provided to produce a magnetic field. Interacting with the magnet arrangement, this magnetic field acts to generate a force to activate a translatory oscillating movement of one of the oscillatory components. The interaction of the magnetic field produced with the inductor and the magnet arrangement also generates torque for activating a rotatory oscillating movement of a second oscillatory motor component. With such an arrangement, both a translatory and a rotatory oscillating movement can be generated; no drive is required.

According to EP 0 850 027 B1, an electromotive drive unit is provided in a casing that, on the one hand, transfers a rotating movement with the help of a drive to a shaft, which movement can be converted, for example, into a rotating movement of a bristle head of the toothbrush. A second component of the electromotive drive unit is connected to the output of the electric motor eccentrically and thus activates a translatory oscillating movement of an oscillating crank around an axis at right angles to the motor axis. The oscillating crank helps to make this pivoting movement and the shaft led into it, which helps transfer the rotatory oscillating movement.

WO 2005/048437 describes a drive unit for producing an oscillating movement, for example, for producing a rotation oscillation of the bristle head of an electric toothbrush or of an electric shaving apparatus. A non-rotation-symmetric rotor moves within a stator that has an inductor and a first and a second magnet arrangement. The rotor has a first and a second radial extension, wherein the magnet arrangements relative to the radial extensions of the rotor allow for a paired allocation between the magnet arrangements and the radial extensions. At the same time, the arrangement is selected in such a way that the magnetic interaction between the magnet arrangement and the radial extension of each pair is greater than the magnetic interaction between the magnet arrangement and the radial extension of two different pairs. This makes it possible to design a rotor with a lower mass and a lower moment of inertia. The rotor is coupled with the stator by means of a righting interaction provided by an elastic element and thus forms an oscillatory system. A periodic pole reversal of the current flow into the inductors produces in this case an oscillating rotation of the rotor. Moreover, the respective rotation in the direction of the "off" position is facilitated by the righting moment produced by the elastic element. As an additional spring, the magnetic righting moment that is exercised on the rotor by the magnets of a magnet arrangement is taken into account. As an elastic element for the righting interaction, embodiments describe a torsion bar, a coil spring or a spiral spring that helps to couple the rotor with the stator. The resonance frequency depends on the spring/mass system formed by the rotor and the elastic element, for example, the torsion bar.

SUMMARY OF THE INVENTION

In one embodiment, an electric motor for operating a small electric device is provided. The electric motor includes at least one first oscillatory motor component; an inductor for producing a magnetic field; and a first magnet arrangement including a first permanent magnet that generates a force for activating a rotatory oscillating movement (R) of the at least one first oscillatory motor component around a rotating axis (z). The at least one first oscillatory motor component and the first magnet arrangement are configured such that a magnetic reluctance torque acting between the first oscillatory motor component and the first permanent magnet operates as a righting moment for the rotatory oscillating movement (R).

BRIEF DESCRIPTION OF THE DRAWINGS

The embodiments set forth in the drawings are illustrative in nature and not intended to limit the invention defined by the claims. The following detailed description of the illustrative embodiments can be understood when read in conjunction with the following drawings, where like structure is indicated with like reference numerals and in which:

DETAILED DESCRIPTION OF THE INVENTION

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

According to the present disclosure, an electric motor having at least one first oscillatory motor component and an inductor for producing a magnetic field is provided. In one embodiment, a first magnet arrangement having at least one first permanent magnet is provided. The magnetic field generates a force for activating a rotatory oscillating movement of the first oscillatory component around a rotating axis, and therefore helps to provide a rotatory oscillating movement.

In one embodiment, the electric motor is characterized in that the at least one first oscillatory motor component and the first magnet arrangement are designed and/or arranged in such a way that the magnetic reluctance torque acting between the first motor component and the at least one permanent magnet acts as the exclusive righting moment for the rotatory oscillating movement. Additional righting moments that are applied, for example, by return springs are therefore unnecessary and thus an especially small design can be achieved.

In one embodiment, when the coil current is switched on, the inductor induces a magnetic flux in the first oscillatory motor component, which is oriented toward minimizing energy in accordance with the magnetic field produced by the first magnet arrangement. In one embodiment, the inductor sets the current at zero, the magnetic field lines of the first magnet arrangement try to bypass the first oscillatory component as much as possible. As a result, the first oscillatory component experiences a righting moment (reluctance torque) that by itself returns the first oscillatory motor component to its starting position.

In one embodiment, it is possible to completely do without additional mechanical oscillating springs because the reset forces are provided solely by the magnetic reluctance torque. This makes construction of the motor much simpler and reduces the number of components, which positively affects the size of the design and the manufacturing costs.

Accordingly, in one embodiment the magnetic reluctance torque, which takes place between the at least one oscillatory motor component and the at least one permanent magnet, is used as the sole righting moment for the rotatory oscillating movement. In particular, in one example the geometries of the first oscillatory motor component and the at least one permanent magnet of the first magnet arrangement are designed in such a way that the magnetic reluctance torque can be used as the sole righting moment for the rotatory oscillating movement. This can take place as part of a numeric simulation of the individual components and the forces acting among them. At the same time, the numeric simulation renders corresponding objective tests unnecessary and makes it possible to set the individual parameters very precisely in advance. The other process steps for the manufacture of electric motors are well known and not essential for the invention. For that reason they are not described separately.

In one embodiment, especially sensitive parameters are, for example, the rotor aperture angle of the at least one oscillatory motor component and the magnet segment angle of the first magnet arrangement. According to one embodiment, the first oscillatory motor component has a rotor that is allocated to the first magnet arrangement, and the rotor aperture angle of the rotor and the magnet segment angle of the first permanent magnet are chosen so that when the electric motor is in operation, an essentially linear course of the reluctance torque between the rotor and the first magnet arrangement is achieved by means of the maximum deflection angle chosen.

In one embodiment, pre-set geometries that result in a linear course that is less than the maximum deflection angle, depending on the magnetic reluctance torque of the deflection angle at least in one area of the deflection angle of the first oscillatory component are utilized. In this way the magnetic reluctance torque acts as a linear righting moment, similar to a mechanical spring.

In another embodiment, the electric motor makes possible additional activation of a translatory oscillating movement. This can be useful, for example, in the case of an electric toothbrush, when both a rotatory movement of a bristle head holding the bristles and a translatory poking movement of the bristle head to remove plaque are desired. To that end, it is suitable if the translatory oscillating movement is perpendicular to the axis of the rotatory oscillating movement.

In one embodiment, at least one second oscillatory motor component and a second magnet arrangement having at least one second permanent magnet that in interaction with a magnetic field produced with the inductor generates a force for activating one such translatory oscillating movement of the at least one second oscillatory component.

Another embodiment provides a second magnet arrangement that has at least one permanent magnet that in interaction with a magnetic field produced with the inductor generates a force for activating an additional translatory oscillating movement of the at least one first oscillatory motor component. The latter embodiment makes it even easier to manufacture an electric motor, and with fewer components, because only one oscillatory motor component is necessary to provide the two different oscillating movements. In contrast, in the former embodiment having two oscillating movements, the translatory and the rotatory oscillating movements are more strongly decoupled from each other, which therefore makes it very easy to adjust [the motor] to special requirements.

When the design is such that the translatory and the rotatory oscillating movements have different resonance frequencies, the individual movements having appropriately chosen activation frequencies of the coil current are activated selectively or under different amplitude conditions. For example, in the case of an electric toothbrush, different cleaning programs can thus be chosen by controls having corresponding frequencies.

One especially simple and easy to manufacture embodiment of the electric motor is characterized in that the first magnet arrangement comprises several permanent magnets arranged coaxially to the first oscillatory component. The permanent magnets having appropriately chosen poles can, for example, be grouped in a circumferential direction around the first oscillatory component. An alternative embodiment provides that the permanent magnets of the first and, optionally, the second magnet arrangement oscillate together with the first oscillatory component, depending on the type of inner rotor used.

In one embodiment, where the first oscillatory motor component carries out not only the rotatory but also the translatory oscillating movement, the second magnet arrangement has several permanent magnets that are connected to the permanent magnets of the first magnet arrangement in at least one axial direction.

In one embodiment, where the rotatory oscillating movement is produced by a first oscillatory motor component and the translatory oscillating movement is produced by a second oscillatory motor component, a flux guiding element is provided that is arranged so that it guides the magnetic flux produced with the inductor for interaction with the at least second permanent magnet. Thus, it is possible that the rotational movement and the translatory movement are independent of each other, and that the angle deflection of the oscillatory motor component activated for the rotatory oscillating movement does not affect the behavior of the oscillatory motor component activated for the translatory oscillating movement, even though both are activated by the magnetic field of the same inductor. The flux guiding element may comprise, for example, a metallic yoke that grasps the coils of the inductor producing the magnetic field.

A small electric device according to one embodiment has at least one oscillatory element in at least one rotatory direction that is activated by an electric motor for activating the at least one rotatory oscillating movement. For example, the small electric device may be an electric shaving apparatus having a cutting head. The electric motor can also be used in an electric toothbrush, wherein the oscillatory element includes a bristle head.

Figure 1:
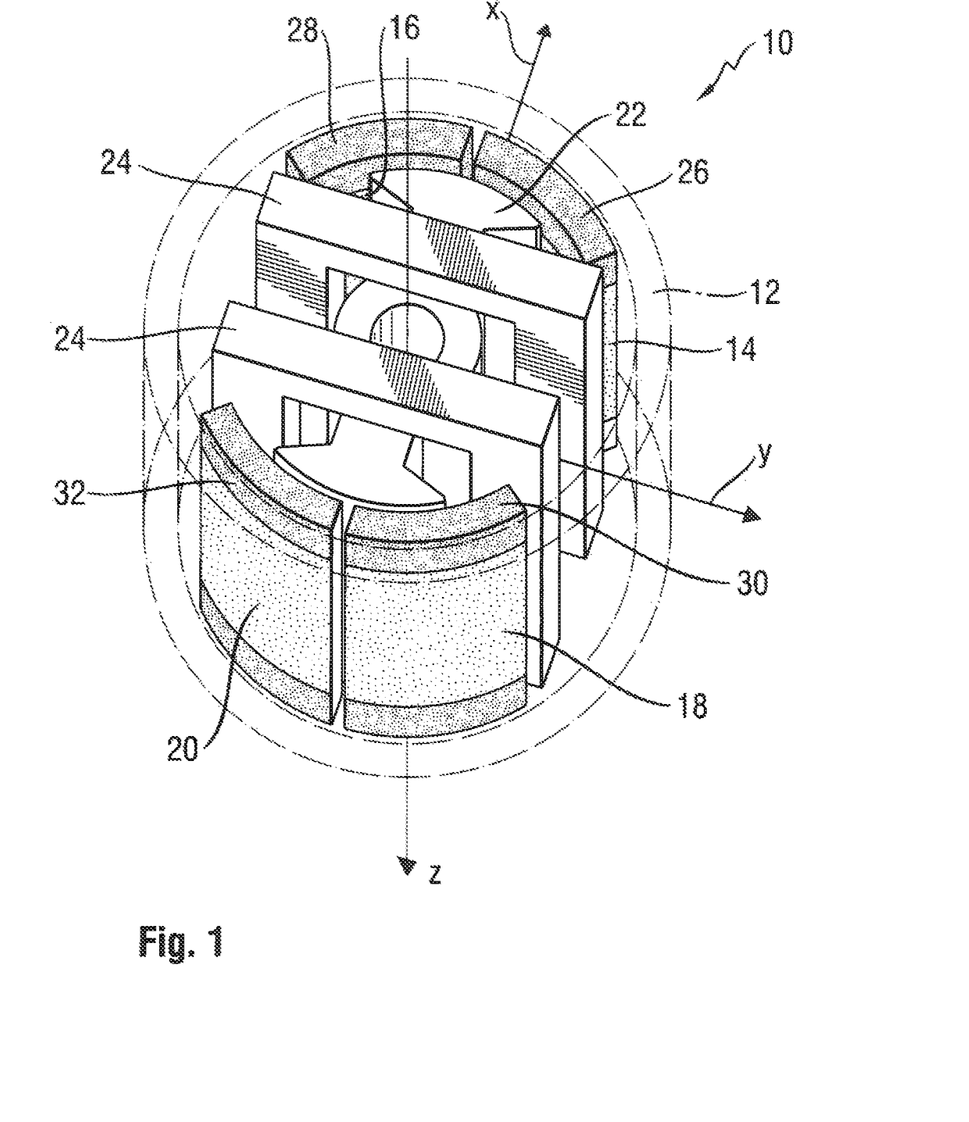
FIG. 1 shows an electric motor according to embodiments shown and described herein.

Turning to the figures, FIG. 1 shows in a partly transparent drawing an electric motor 10. In a metallic casing 12, which is shown here as transparent so as to show the components located within it, is located a first magnet arrangement having permanent magnets 14, 16, 18 and 20. The arrangement here has been chosen so that in the case of magnets 14 and 18 the magnetic south pole is shown toward the z-axis, i.e. it radiates inward, while the magnetic north pole is shown radiating outward. In the case of magnets 16 and 20, on the other hand, the magnetic south pole is shown radiating outward and the magnetic north pole is shown radiating inward toward the rotating axis z. These permanent magnets 14, 16, 18 and 20 form the first magnet arrangement, which is used to produce a rotatory oscillating movement of the rotor 22 around the rotating axis z. In addition, the electric motor 10 here has a two-part electromagnetic inductor 24 whose coil surfaces are perpendicular to the coordinate axis x. The rotor 22 is made from suitable metallic and magnetizable material, for example iron.

In one embodiment, a second magnet arrangement includes permanent magnets 26, 28, and 32 that are connected axially in the z-direction to the magnets of the first magnet arrangement. Whereas in this embodiment the arrangement of the north and south poles of the magnets 30 and 32 corresponds to the arrangement of the magnetic poles of the adjacent permanent magnets 18 and 20 of the first magnet arrangement, in the case of the permanent magnets 26 and 28 the polarity is different than that of the permanent magnets 14 and 16 of the first magnet arrangement that are connected axially and directly. Accordingly, in particular in the case of the magnets 26 and 32, the south pole is shown radiating outward while the north pole is shown radiating inward toward the z-axis. In the case of the permanent magnets 28 and 30, the north pole is shown radiating outward while the south pole is shown radiating inward in the direction of the z-axis. The magnets 18 and 30, just like the magnets 20 and 32, can also be constructed, for example, as one unit. The metallic and magnetizable casing 12 provides a magnetic yoke for the arrangement of the permanent magnets of the first and of the second magnet arrangement.

Figure 2:
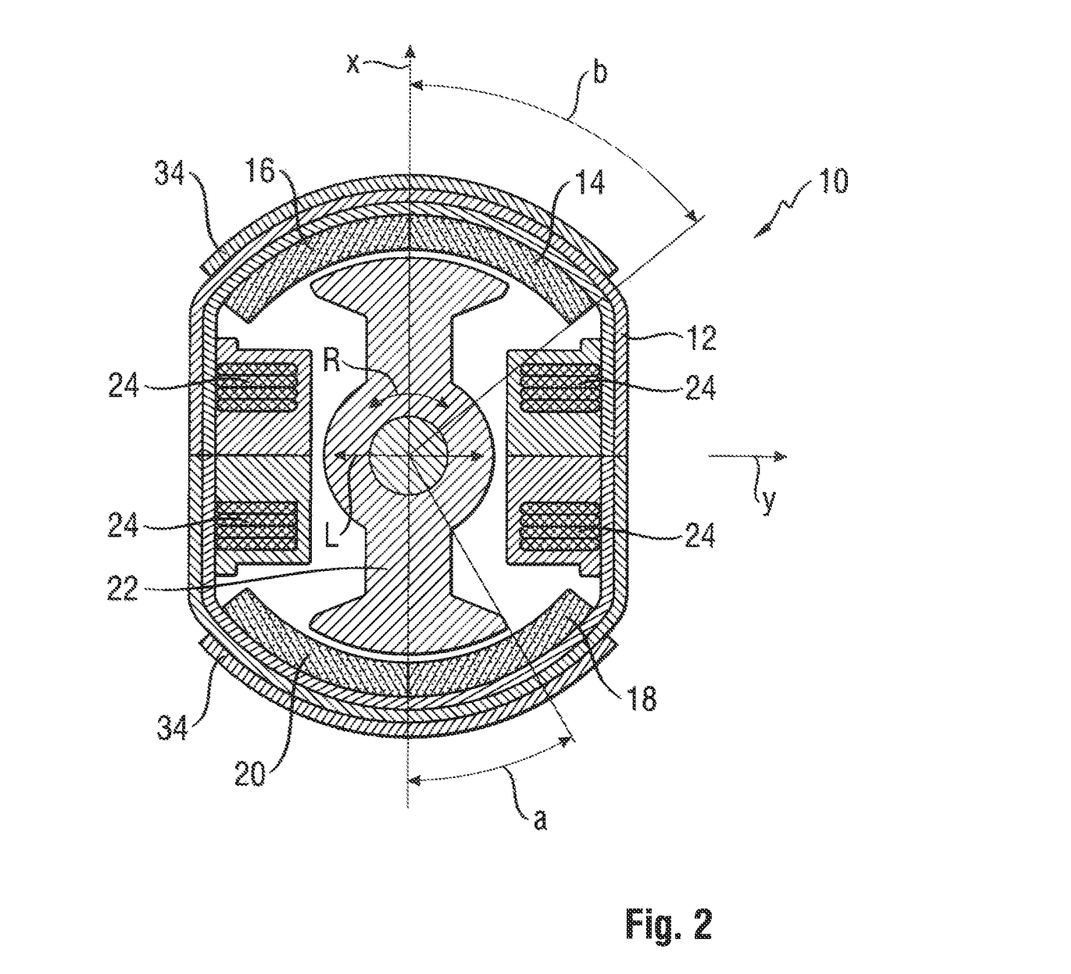
FIG. 2 shows a lateral cut through the rotation unit of an electric motor according to embodiments shown and described herein.

FIG. 2 shows the lateral cut of an easily modified embodiment in the amount of the first magnet arrangement that is provided for the rotatory oscillating movement. In addition, shown here is the direction of movement of the rotatory oscillating movement R and the direction of movement of the translatory oscillating movement L, which the rotor 22 carries out during full operation. The example of the embodiment of FIG. 2 explains the parameters a and b. b denotes the magnet segment angle, which is a measurement of the circumferential dimension of a permanent magnet 14, 16, 18 and 20 of the first magnet arrangement. a denotes the corresponding size of the rotor 22 arranged here within the first magnet arrangement that rotates around the z-axis, and which hereinafter is called the rotor aperture angle. FIG. 2 shows the electric motor in the "off" position. At that point, the rotor 22 is symmetric to the first permanent magnet arrangement 14, 16, 18 and 20. The x-axis shown then forms the center axis of the mirror-image arrangement from rotor 22 and the first permanent magnet arrangement 14, 16, 18 and 20. The magnet segment angle b is determined between the S center axis (the x-axis) and the maximum circumferential dimensions of the first permanent magnet arrangement 14, 16, 18 and 20. The rotor aperture angle a is also determined between the center axis (the x-axis) and the maximum circumferential dimensions of the rotor 22.

In another embodiment of FIG. 2, the two-layered metallic casing 12 in the area of the permanent magnets 14, 16, 18 and 20 is also reinforced by the casing reinforcement 34, which also is metallic and magnetizable and which helps improve the magnetic yoke of the magnetic field lines of the permanent magnets.

Figure 3:
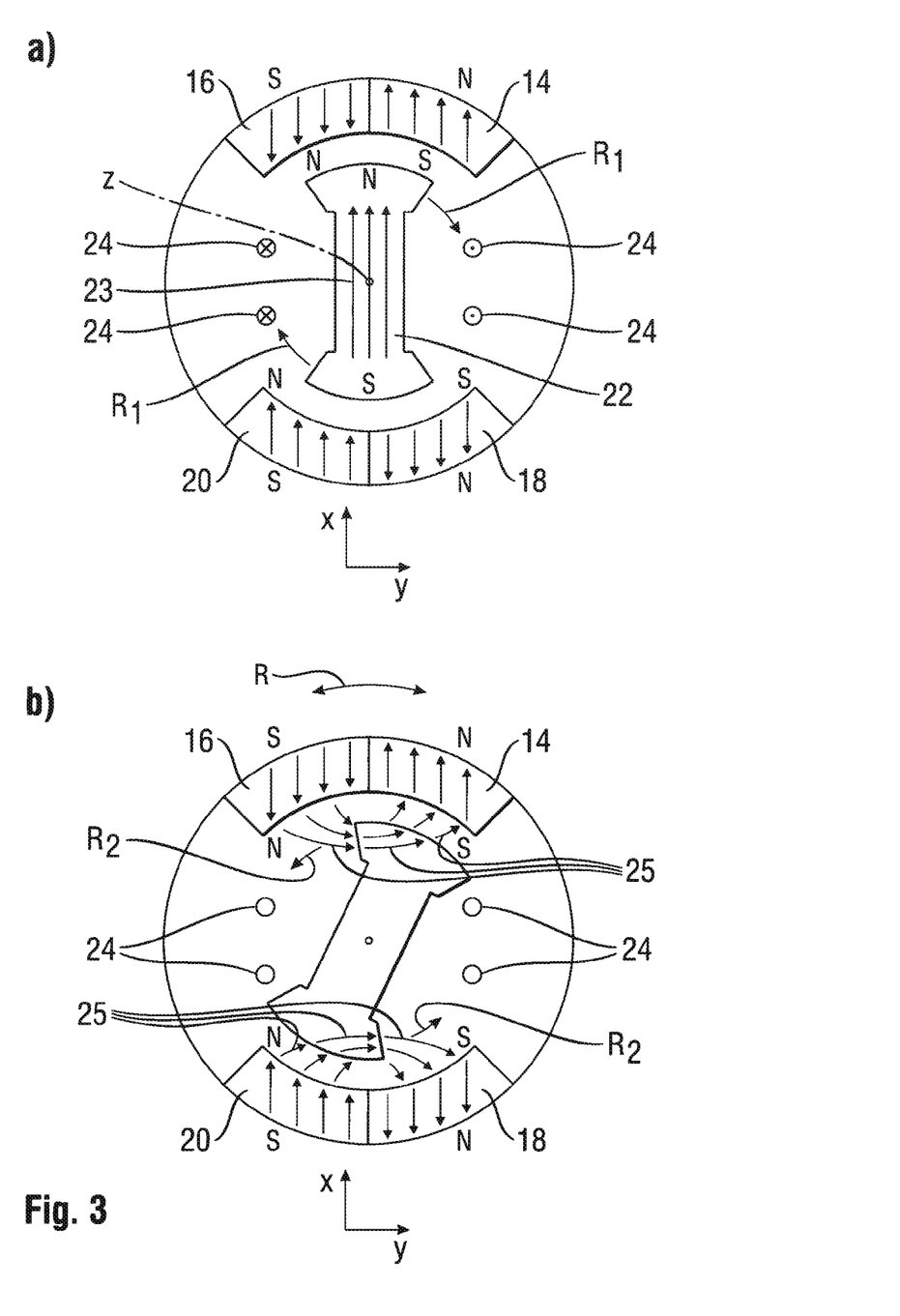
FIGS. 3*a* and 3*b* are schematic drawings for explaining the righting moment for the rotatory oscillating movement in an electric motor according to embodiments shown and described herein.

FIG. 3 shows by means of two schematic figures the basic mode of action of the embodiments according to the present disclosure by utilizing the magnetic reluctance as the righting moment for the rotatory oscillating movement. The magnetic field polarities of the permanent magnets 14, 16, 18 and 20 of the first magnetic field arrangement are indicated here as arrows between the south pole (S) in the direction of the north pole (N). The magnetic field lines yoke in a known manner the casing 12 (not shown here) to the casing reinforcement 34. FIG. 3A shows the arrangement at a time when the rotor 22 is in its "off" position.

If the coil current as shown in the schematically indicated inductor 24 is switched on, magnetic flux is produced in the metallic rotor 22 in the direction of the flow lines 23. At the same time, a cross in the described lateral cut of the inductor 24 is intended to signify a current direction opposite to a point in the described lateral cut. A magnetic south pole and a magnetic north pole (drawn above it in the figure) are formed. The rotor, which can rotate around the z-axis, tries to align itself with minimum energy in this field so that a force in the direction of the arrow R1 is created to deflect the rotatory oscillating movement. When the rotor 22 has aligned itself accordingly with minimum energy, the north pole of the rotor 22 and the south pole of the permanent magnet 14 are opposite each other, as are the south pole of the rotor 22 and the north pole of the permanent magnet 20.

If the coil current is now set at zero, a situation like that in FIG. 3b will be created. A magnetic flux is no longer available within the rotor 22, which would be induced by the coil current in the inductor 24. The magnetic field lines within the magnets 16 and 14, on the one hand, and 20 and 18, on the other hand, try to bypass the metallic rotor 22, as is indicated in FIG. 3b by arrow 25. The most energy can be minimized when the yoke of the magnetic field lines with regard to the rotor 22 is as large as possible. This is the case when the rotor is arranged symmetrically to the permanent magnets 14 and 16, on the one hand, and 18 and 20, on the other hand, and in this respect it is again aligned perpendicular in the figures. This results in a force (magnetic reluctance force) that returns the rotor 22 to its symmetrical "off" position. The resulting direction of movement is indicated as $R_2$ and is opposite to the deflecting direction o $R_1$, which was explained in relation to FIG. 3a.

In the electric motors according to the present disclosure, in particular the rotor aperture angle a and the magnet segment angle b are set, with the help of numeric simulations, in such a way that under other geometric conditions, the resulting reset force has a desired value in the direction $R_2$ that is sufficient to cause a righting moment for the rotatory oscillating movement of the rotor 22. This makes other, in particular mechanical, return springs unnecessary. Alternatively, the rotor aperture angle a and the magnet segment angle b can be determined with the help of tests. In the case of given specifications of the electric motor (for example: torque, frequency, performance, maximum geometric measurements, materials), this results in an optimal linearization of the reluctance torque across the given angular field of the rotatory oscillating movement of the rotor. An analogous spring constant can be derived with regard to the reluctance torque—as is described below. By choosing the mass moment of inertia, in particular with regard to the length of the motor (i.e. in the direction of extension of the motor shaft), the desired resonance frequency of the electric motor can be adjusted.

Figure 4:
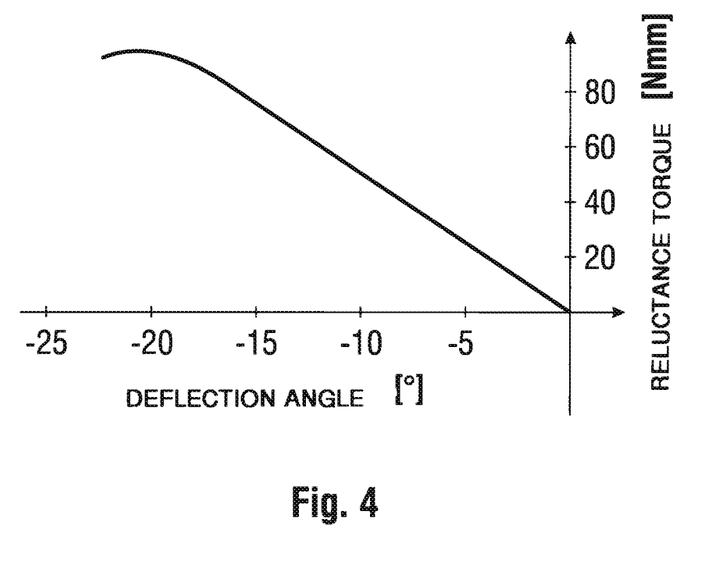
FIG. 4 shows the course of the reluctance torque as a function of the deflection angle of the rotor for one example of an electric motor according to embodiments shown and described herein.

In all the embodiments described above and below, rotor aperture angle a and magnet segment angle b, are chosen in such a way that in a large as possible field of the deflection angle of the rotor 22, the reluctance torque (which corresponds to the torque resulting from the reluctance force) is a linear function of the deflection angle. FIG. 4 shows a corresponding example in which one such linear connection is given for a deflection angle of up to –15°. Because of its linear dependence on the deflection angle, the reluctance torque then acts like a mechanical return spring. In one embodiment, with regard to the deflection angle, the linearized reluctance torque has the effect that the maximum reluctance torque is then available. The value of non-linearized reluctance torque runs is, at least in sub-ranges, less than the linearized reluctance torque curve. Even a minor deviation (for example 1 degree) either of the rotor aperture angle a or of the magnet segment angle b, from the optimal value may lead to significantly lower and non-linear reluctance torque runs across the desired deflection angular field, which in the end means that the reluctance force can no longer be used by itself as the sole reset force.

Thus, the rotatory movement of this embodiment is initiated by activating the coil current in the inductor 24, which triggers the movement $R_1$ shown in FIG. 3a, which moves the rotor 22 from its "off" position shown in FIG. 3a. Cutting off the coil current leads to the magnetic field lines of the permanent magnets 14 and 16, on the one hand, and 18 and 20, on the other hand, bypassing the rotor 22, which causes the resulting magnetic reluctance torque to move in the direction $R_2$. A suitable choice of parameters, for example, of the rotor aperture angle a and of the magnet segment angle facilitates the design according to one embodiment; the restoring torque in the direction $R_2$ is sufficient to maintain the oscillating movement without additional mechanical return springs.

In the embodiment shown in FIG. 1 of an electric motor, the second magnet arrangement with the permanent magnets 26, 28, 30 and 32 can cause, in addition to the rotatory oscillating movement, the translatory oscillating movement L in direction Y already described in FIG. 2. The movement L corresponds to a tapping motion, so that the magnets of the second magnet arrangement are hereinafter also called "tapping magnets."

Figure 5:
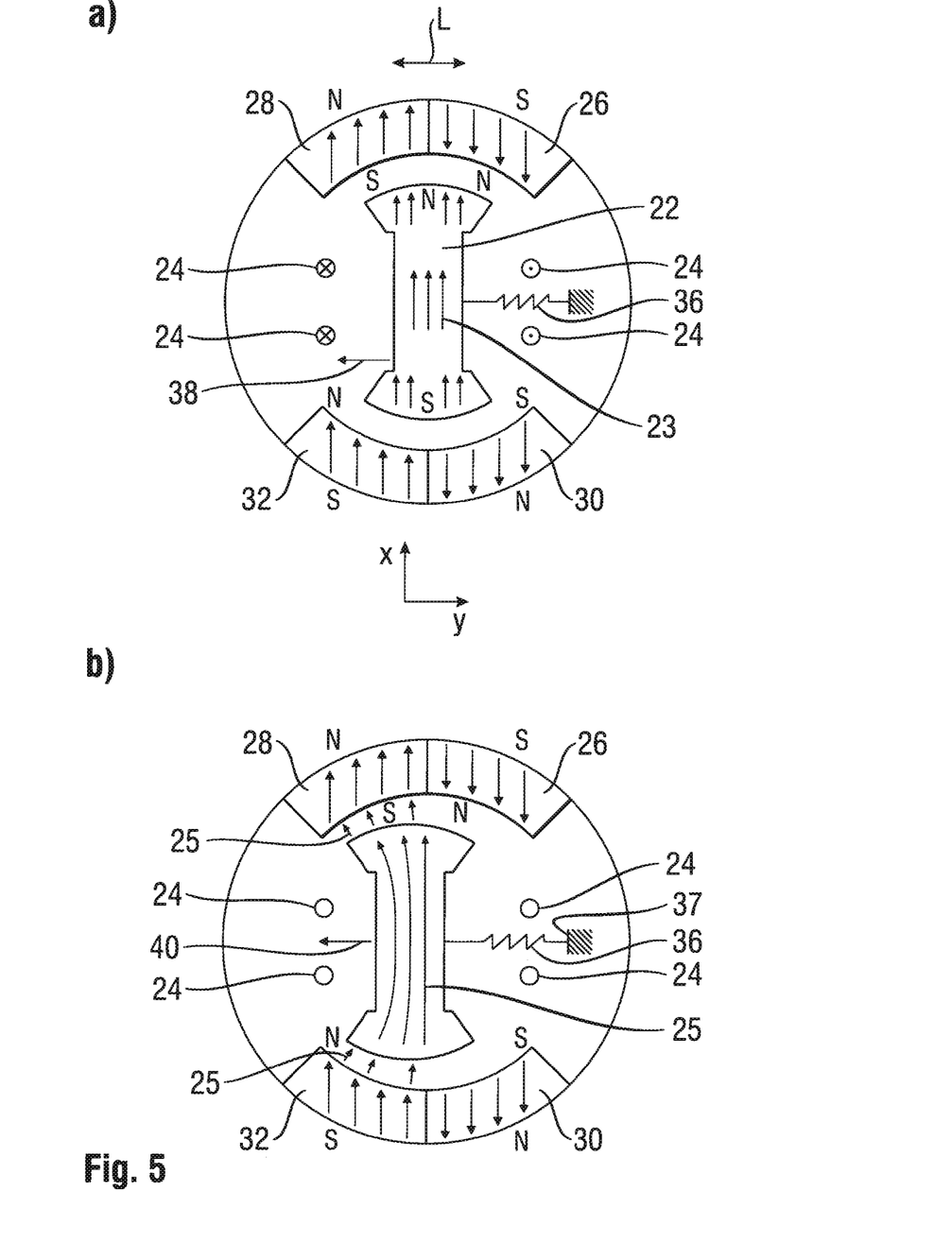
FIGS. 5*a* and 5*b* are schematic drawings for explaining the reluctance power of a translatory deflection of the rotor of an embodiment of an electric motor according to embodiments shown and described herein.

FIG. 5 shows the magnetic conditions in the area of the tapping magnets 26, 28, 30 and 32 of the second magnet arrangement, which in the embodiment of FIG. 1 axially connect to the first magnet arrangement in the direction of the axis z.

While the magnetic polarity of the tapping magnets 30 and 32 corresponds to the magnetic polarity of the magnets 18 and 20, the magnetic polarity of the magnets 26 and 28 is inverse to the magnetic polarity of the magnets 14 and 16. When the coil current is switched on in the inductor 24, as is shown in FIG. 5a, magnetic flux (indicated by the flux lines 23) is created in the rotor 22. Because of the magnetic interaction between the rotor 22 and the permanent magnets 26, 28, 30 and 32, a force 38 is created.

In one embodiment, because of the force 38, the rotor 22 is deflected in a translatory manner in the y-direction, creating the situation shown in FIG. 5b. If, as is indicated in FIG. 5b, the coil current in the inductor 24 is set at zero, this causes a magnetic reluctance force 40, which triggers the magnetic field lines within the permanent magnets 28 and 32 to try to bypass the metallic and magnetizable rotor 22, as is indicated by the magnetic field lines 25.

The reluctance force 40 here acts in the same direction as the tapping force 38, so that sufficient counteracting force must be generated by a mechanical spring 36 so that the rotor 22 is not pressed against the magnets. Only shown schematically is that this spring 36 is fixed to the casing at a point 37.

Figure 6:
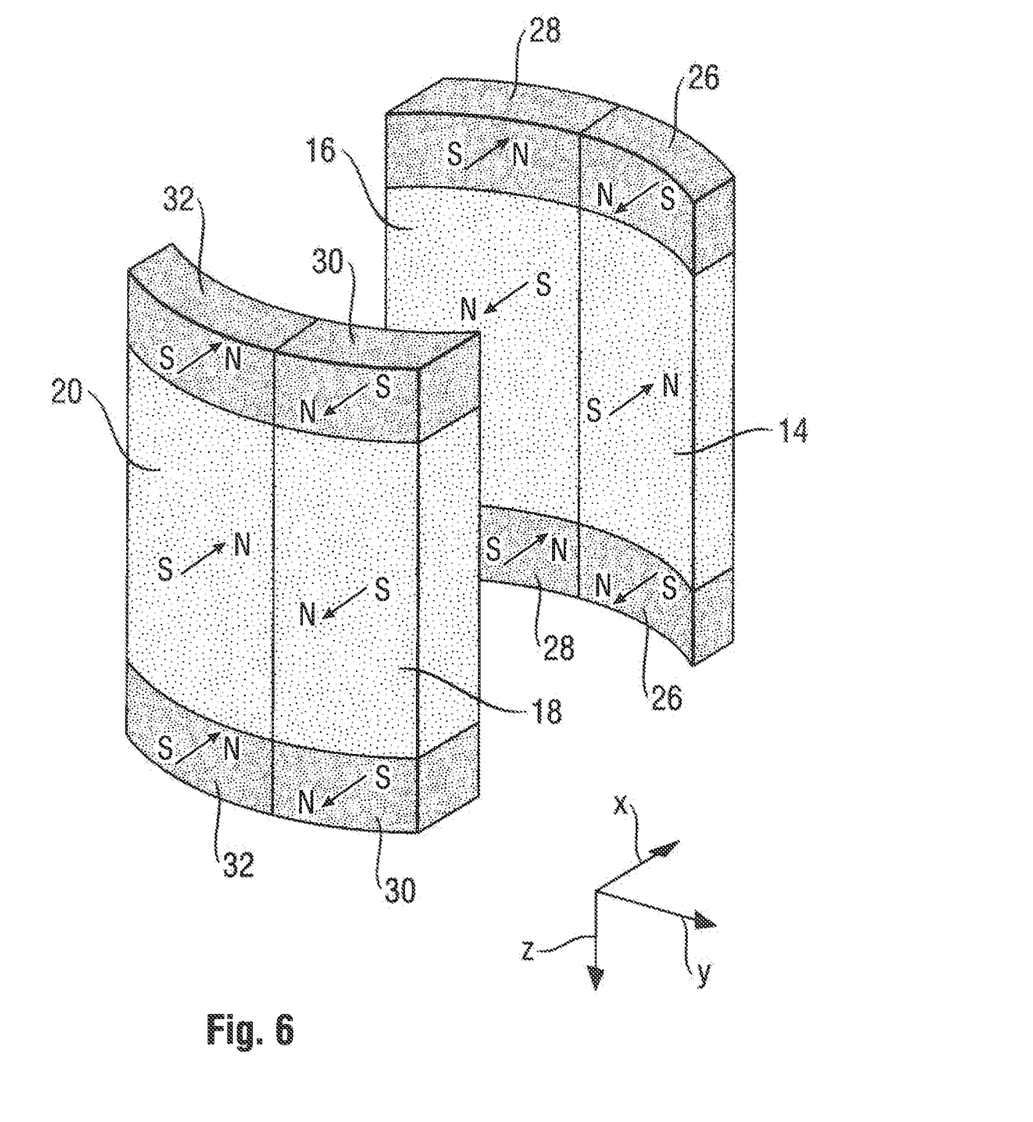
FIG. 6 shows the arrangement of the permanent magnets of the first and second magnet arrangements for a second embodiment of an electric motor according to the invention.

FIG. 6 shows a modified embodiment of the embodiment of FIG. 1, in which the second magnet arrangement of tapping magnets is present twice. Each second magnet arrangement 26, 28, 30 and 32 is attached to the two axial sides of the first magnet arrangement 14, 16, 18 and 20. In turn, FIG. 6 shows the polarities of the magnets as arrows. The double presence of the second magnet arrangement 26, 28, 30 and 32 increases the tapping effect that was explained with regard to FIG. 5.

Figure 7:
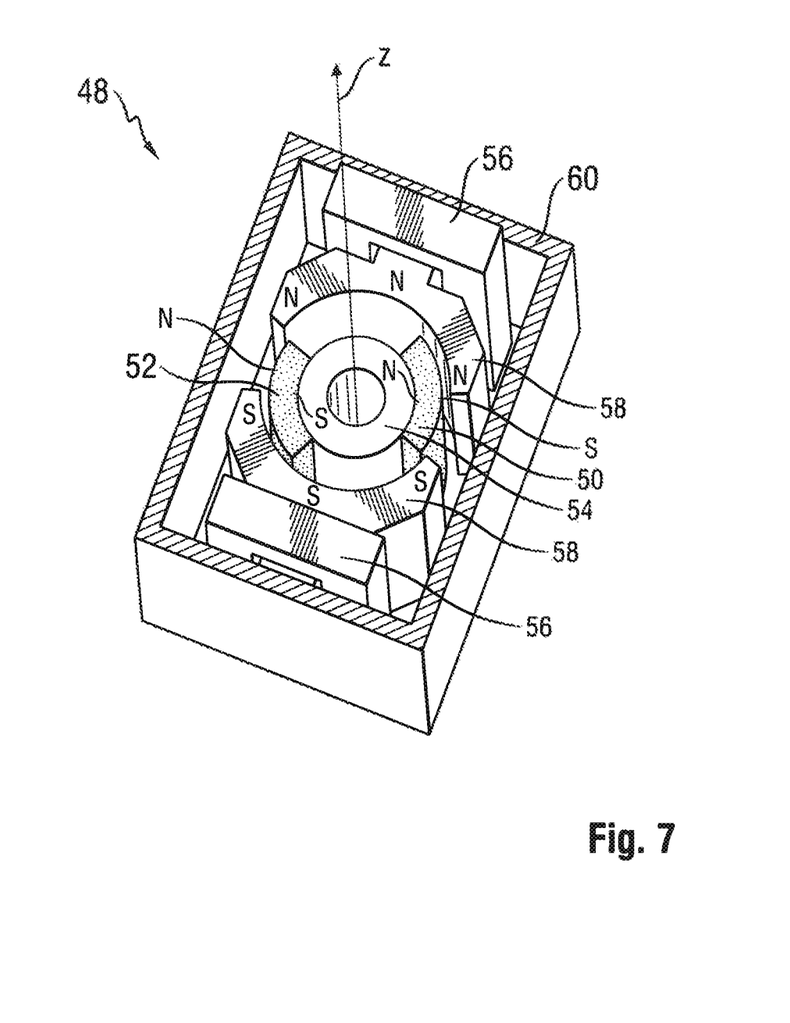
FIG. 7 is a schematic drawing of a third embodiment of an electric motor according to embodiments shown and described herein.

FIG. 7 shows a further embodiment for generating a rotatory oscillating movement. In this motor 48, the permanent magnets 50 and 52 are solidly mounted on the rotor 54 and form in the previously chosen nomenclature the permanent magnets a first magnet arrangement. The polarities of the magnetic elements are indicated as north poles N and south poles S. The rotor 54 rotates around the z-axis together with the permanent magnets 50 and 52 in an area that is partially surrounded by two stators 58, wherein the stators are arranged as shown in a two-part inductor 56. If a current is activated in the inductor 56, magnetic flux is induced in the stators. A north pole is then created at the rotor end of one stator, while a south pole is created at the rotor end of the other stator 58. The magnetic yoke occurs across the magnetizable casing 60.

In this embodiment, the reset force that is necessary to return the rotor to its starting position is also formed by the magnetic reluctance force that is set between the permanent magnets 50 and 52 and the stators 58 after the coil current is switched off. For example, the geometries of the individual elements are chosen by numeric simulation so that no other reset elements need be present in addition to the magnetic reluctance force.

The embodiment of FIG. 7 can also be expanded by additional tapping magnets that are connected to the permanent magnets of the first magnet arrangement 50 and 52 in an axial direction. Using the embodiment of FIG. 7, in addition to the rotating movement around the Z-axis, a tapping motion of the rotor is possible in a manner analogous to the embodiments already described.

Figure 8:
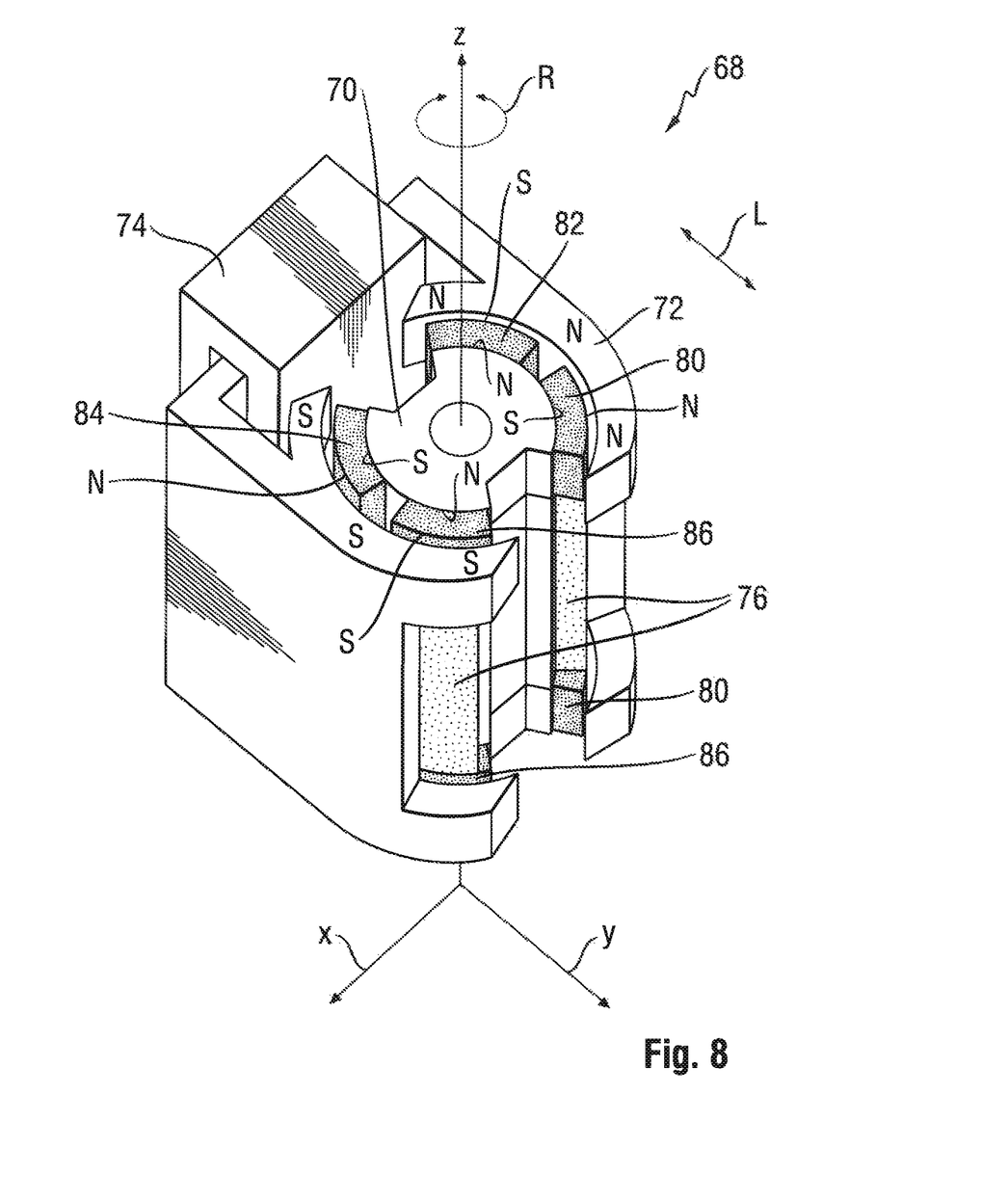
FIG. 8 is a schematic drawing of a fourth embodiment of an electric motor according to embodiments shown and described herein.

FIG. 8 shows another embodiment of a motor 68, in which the design is asymmetric and only one inductor 74 is used. As in FIG. 7, in this instance the permanent magnets move with the rotor 70 within a solid stator 72. A magnetic pole arrangement, for example (indicated by the letters N and S on the stator 72), is formed in the stator 72 in the case of a corresponding coil current direction in the inductor 74. Visible in the drawing of FIG. 8 are two of four permanent magnets 76 of the first magnet arrangement that are attached to the rotor 70 and which are responsible for the rotatory oscillating movement in a manner analogous to that of the permanent magnets 14, 16, 18 and 20 of the first magnet arrangement that is described in relation to FIGS. 1 through 5 and 6. Two additional permanent magnets of the first magnet arrangement are not visible in the drawing of FIG. 8 because the stator 72 covers them.

Tapping magnets 80, 82, 84 and 86 of the second magnet arrangement, which are responsible for the translatory oscillating movement L in the y-direction, are connected on both sides of the permanent magnets of the first magnet arrangement in the direction of the z-axis. In addition, in the embodiment of FIG. 8 the geometries are chosen in such a way that for the rotatory oscillating movement around the z-axis the magnetic reluctance torque acts as a single righting moment in order to return the rotor 70 to its starting position after deflection in the rotatory direction and the coil current is switched off.

The embodiments that were described in relation to FIGS. 1 through 8 are characterized in that the rotor, as the first oscillatory component, provides both the rotatory oscillating movement and the translatory oscillating movement that can be transferred, for example, directly to a bristle head of a toothbrush.

Figure 9:
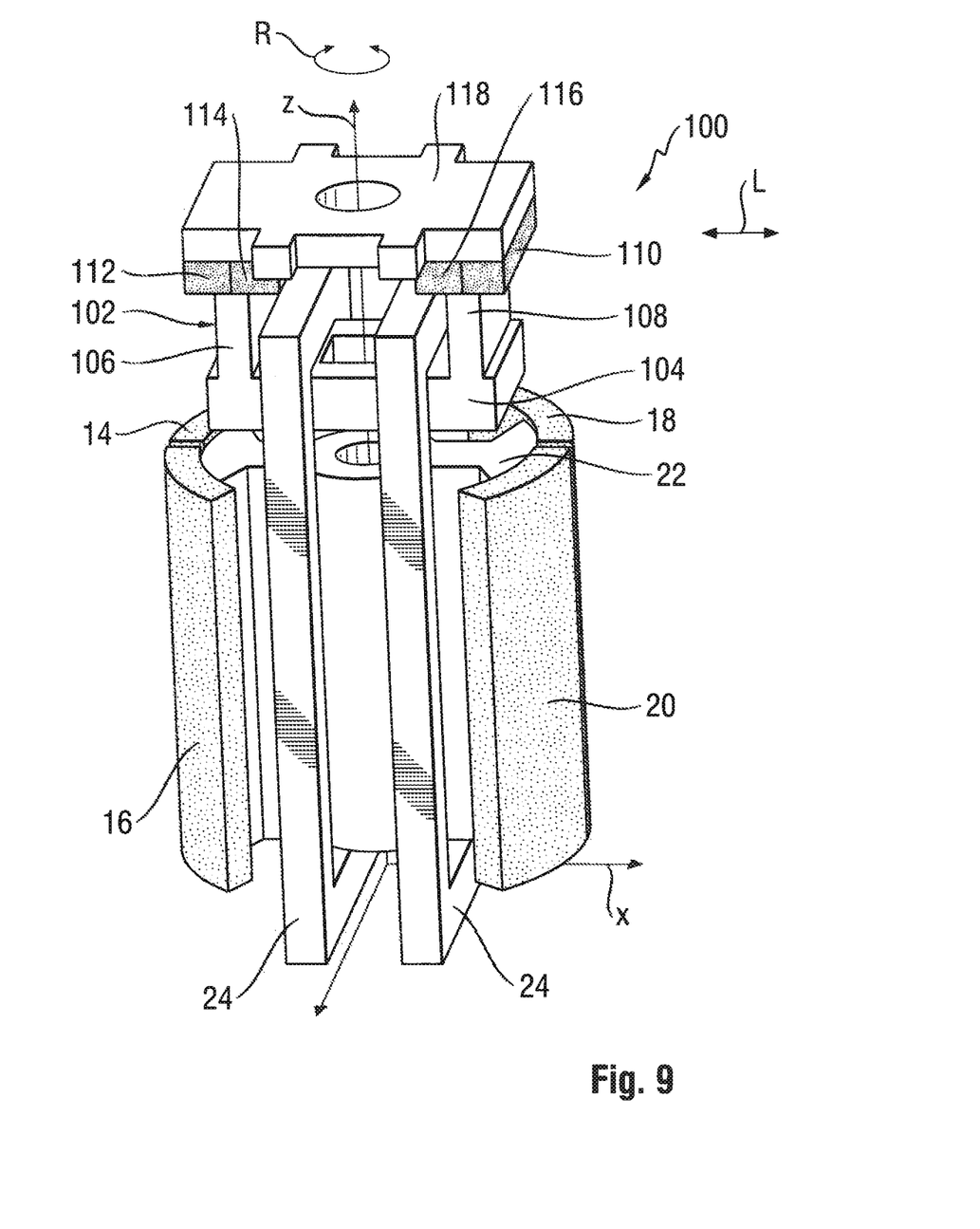
FIG. 9 is a schematic drawing of a fifth embodiment of an electric motor according to embodiments shown and described herein.

FIG. 9 shows an embodiment of a motor 100, in which a first oscillatory component is formed by the rotor 22 that in this instance is responsible only for the rotatory oscillating movement. The rotatory oscillating movement is produced by a first magnet arrangement 14, 16, 18 and 20 by a magnetic field of an inductor 24, as was already explained in relation to the first magnet arrangement of FIG. 1. Because the mode of operation is the same as the embodiment of FIG. 1, the same reference numbers were used.

The magnetization of the permanent magnets 14, 16, 18 and 20 is also the same as in the embodiment of FIG. 1.

Also arranged in the embodiment of FIG. 9 is the rotor 22 within the inductor 24, which in this instance consists of two elements, and which in the arrangement shown produces a magnetic field in the x-direction when current flows through it. The rotor 22 rotates around the z-axis so that it is magnetized by the magnetic field produced when the inductor is switched on.

Also located within the coils of the inductor 24 is a U-shaped flux guiding element 102 consisting of, for example, iron having a base 104 and two flux guiding side pieces 106 and 108. When the coil current is switched on, a magnetic flux is induced within it that is received by a second magnet arrangement that comprises two permanent magnets, wherein, for example, the segments 110 and 112 are south poles and the segments 114 and 116 are north poles. The magnetic segments are solidly connected to a rotor 118 that is mounted in such a way that it can carry out a translatory oscillating movement in direction L.

Induction by the inductor 24 of a magnetic flux in the flux guiding element 102 causes an energy-minimizing alignment of the magnets of the second magnet arrangement 110, 112, 114 and 116, which causes the rotor 118 to move in the x-direction, i.e. in the radial direction with regard to the rotating axis z of the rotor 22.

The rotor 22, the flux guiding element 102 and the rotor 118 each have a central hole through which a shaft (not shown) that the rotor 22 helps to rotate is conducted. At the same time, the central hole of the rotor 118 has, at a minimum, large enough dimensions so that a shaft connected to the rotor 22 does not participate in the translatory oscillating movement L of the rotor 118.

The oscillating movements of the rotor 118 and of the rotor 22 are therefore independent of each other. The rotor 118 and the rotor 22 can therefore be used, if necessary, as independent drives for a translatory (L) and a rotatory (R) oscillating movement.

In addition, in the embodiment of FIG. 9, similar to the embodiment of FIG. 1, the geometries of the individual elements, in particular the rotor aperture angle of the rotor 22 and the magnet segment angle of the permanent magnets of the first magnet arrangement, are chosen in such a way that the magnetic reluctance torque acts as a resetting force for the rotatory oscillating movement.

Figure 10:
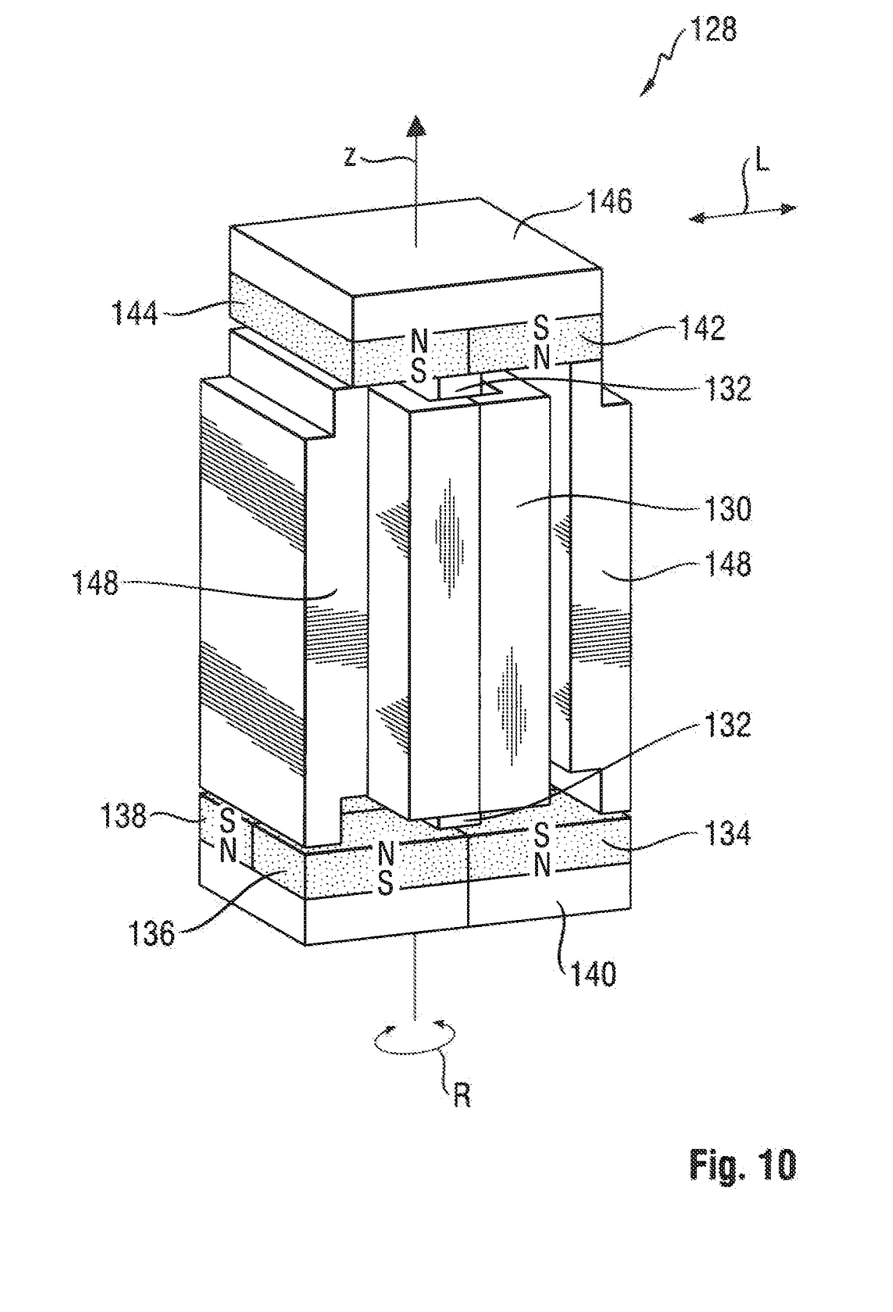
FIG. 10 is a schematic drawing of a sixth embodiment of an electric motor according to embodiments shown and described herein.

FIG. 10 shows a further embodiment of the electric motor 128, in which the rotatory oscillating movement and the translatory oscillating movement are carried out by two independent elements. In this example, an inductor 130 surrounds a metallic and magnetizable core 132. In the arrangement of FIG. 10, the longitudinal alignment of the core 132 is parallel to the axis of the inductor.

In FIG. 10, the first magnet arrangement responsible for the rotation is arranged underneath the inductor 130 and comprises the permanent magnets 134, 136 and 138. A fourth permanent magnet (not visible in the drawing of FIG. 10) forms a rectangle together with the permanent magnets 134, 136 and 138. The polarity of the permanent magnets is in each instance indicated by the letters N (north pole) and S (south pole). The polarity of the invisible magnet corresponds to that of the permanent magnet 136. Underneath the permanent magnet is located a metallic and magnetizable element 140 as a magnetic yoke. When a current is induced in the inductor 130 that leads, for example, to the formation of a north pole at the bottom end of the core 132, a movement of the permanent magnets 134, 136 and 138, together with the metallic yoke 140, is activated around the z-axis. In FIG. 10, above the inductor 130 are arranged the permanent magnets of a second magnet arrangement that is responsible for a tapping movement. The polarity of these permanent magnets 142 and 144 is also indicated by the letters N (north pole) and S (south pole). When a current is activated in the inductor 130 that generates a magnetic flux in the metallic core 132 that leads to the south pole at the top end of the core 132, the arrangement of the permanent magnets 142 and 144 in FIG. 10 moves to the left. Reversing the polarity of the current direction results in a movement to the right. The permanent magnets 142 and 144 are magnetically yoked by means of an element 146 that comprises suitably magnetizable metallic material.

The arrangement and design of the permanent magnets 134, 136 and 138 in relation to the core 132 can be determined by numeric simulation so that in this embodiment as well, the magnetic reluctance force acts as a righting moment for the rotatory oscillating movement. Thus, the element 140 can act as an output for a rotatory oscillating movement and the element 146 can act as an output for a translatory oscillating movement. The feature in which the magnetic reluctance force is used as the sole righting moment for the rotatory oscillating movement is common to all the described embodiments.

To ensure that the magnetic reluctance force provides an adequate reset force for the rotatory oscillating movement, the following procedure may be followed. First, the desired requirements of the motor (for example: torque, frequency, performance, maximum geometric measurements or other design limitations) are compiled. A motor system that, for example, corresponds to one of the embodiments shown is accepted. In particular, the magnet segment angle b and the rotor aperture angle a, as they are explained in relation to FIG. 2, or relevant dimensions in the case of other geometries, are varied as part of a numeric simulation until a suitable configuration is found in which the reluctance torque is linear across the prescribed angular field.

Finally, the desired frequency for the rotatory oscillating movement can be established. To that end, an analogous spring constant is determined from the reluctance torque and the deflection angle. If the linear course of the reluctance torque depends on the angle (as is the case, for example, in FIG. 4), the spring constant is constant. The mass moment of inertia of the rotor, including the shaft, is also calculated. The resulting oscillation frequency is then $(1/(2\pi))\cdot(\text{spring constant}/\text{mass moment of inertia})^{1/2}$. This example simply calculates the frequency as a single-mass oscillator, wherein a second mass that is formed, for example, by the casing can be included in the calculation in a known manner. By varying, in particular, the magnet segment angle and the rotor aperture angle, the course of the reluctance torque as a function of the deflection angle, i.e. the spring constant, can be chosen. The desired frequency can be chosen by appropriately choosing the spring constant and the moment of inertia.

In embodiments that provide both a rotatory and a translatory oscillating movement, the reset force for the translatory oscillating movement can be guaranteed by mechanical reset elements. In particular, the resonance frequency of the translatory oscillating movement can be adjusted far away from the resonance frequency of the rotatory oscillating movement so that the individual oscillations can be activated independent of one another, provided the activation of the coil current in the inductor corresponds to the resonance frequency of one of these oscillating movements.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electric motor for operating a small electric device, comprising:
   at least one first oscillatory motor component;
   an inductor for producing a magnetic field;
   a first magnet arrangement including a first permanent magnet that generates a force for activating a rotatory oscillating movement (R) of the at least one first oscillatory motor component around a rotating axis (z);
   at least one second oscillatory motor component; and
   a second magnet arrangement including a second permanent magnet configured to generate a force for activating a translatory oscillating movement (L) of the at least one second oscillatory motor component in y-direction;
   wherein the at least one first oscillatory motor component and the first magnet arrangement are configured such that a magnetic reluctance torque acting between the first oscillatory motor component and the first permanent magnet operates exclusively as a righting moment for the rotatory oscillating movement (R) to maintain the oscillatory movement without any additional mechanical return springs; and wherein the translatory oscillating movement (L) is perpendicular to the rotating axis (z) of the rotatory oscillating movement (R).

2. The electric motor according to claim 1, wherein the second magnet arrangement interacts with a magnetic field produced with by the inductor in order to generate a force for activating a translatory oscillating movement (L) of the at least one first oscillatory motor component.

3. The electric motor according to claim 1, wherein the translatory (L) and the rotatory (R) oscillating movements have different resonance frequencies.

4. The electric motor according to claim 1, wherein the first magnet arrangement includes two or more permanent magnets arranged coaxially to the first oscillatory component.

5. The electric motor according to claim 1, wherein the second magnet arrangement includes two or more permanent magnets that are connected in at least one axial direction to the permanent magnets of the first magnet arrangement.

6. The electric motor according to claim 1, further comprising at least one flux guiding element.

7. The electric motor according to claim 1, wherein the axis of the at least one inductor and the rotating axis (z) of the rotatory oscillating movement (R) are perpendicular to each other.

8. The electric motor according to claim 1, wherein the first and second magnet arrangements in the direction of axis of the at least one inductor are arranged on different sides of the inductor.

\* \* \* \* \*